United States Patent
Schröder et al.

(10) Patent No.: US 7,336,566 B2
(45) Date of Patent: Feb. 26, 2008

(54) METHOD AND APPARATUS FOR TRACK TYPE IDENTIFICATION, AND METHOD OF TRACK JUMP

(75) Inventors: Heinz-Jörg Schröder, Le Chevalon de Voreppe (FR); Christian Büchler, Villingen-Schwenningen (DE); Stefan Kimmelmann, Bad Duerrheim (DE)

(73) Assignee: Thomson Licensing, Boulogna Billancourt (FR)

( * ) Notice: Subject to any disclaimer, the term of this patent is extended or adjusted under 35 U.S.C. 154(b) by 1042 days.

(21) Appl. No.: 10/450,204

(22) PCT Filed: Dec. 10, 2001

(86) PCT No.: PCT/EP01/14460

§ 371 (c)(1),
(2), (4) Date: Jun. 11, 2003

(87) PCT Pub. No.: WO02/50824

PCT Pub. Date: Jun. 27, 2002

(65) Prior Publication Data

US 2004/0052182 A1 Mar. 18, 2004

(30) Foreign Application Priority Data

Dec. 21, 2000 (DE) .................. 100 64 053

(51) Int. Cl.
*G11B 7/00* (2006.01)
(52) U.S. Cl. ................ 369/44.14; 369/44.28; 369/53.44; 369/112.01; 370/352

(58) Field of Classification Search ........... 370/352; 369/44.14, 44.28, 53.44, 112.01
See application file for complete search history.

(56) References Cited

U.S. PATENT DOCUMENTS

| | | | |
|---|---|---|---|
| 5,097,464 A | * | 3/1992 | Nishiuchi et al. ...... 369/112.29 |
| 5,414,451 A | * | 5/1995 | Sugiyama et al. .......... 347/258 |
| 6,631,114 B1 | * | 10/2003 | Kobayashi ............... 369/275.4 |

FOREIGN PATENT DOCUMENTS

| | | |
|---|---|---|
| EP | 751504 | 1/1997 |
| EP | 841657 | 5/1998 |
| EP | 1073044 | 1/2001 |

OTHER PUBLICATIONS

Search Report dated Apr. 26, 2002.

* cited by examiner

*Primary Examiner*—Quynh H. Nguyen
(74) *Attorney, Agent, or Firm*—Joseph J. Lake; Harvey D. Fried; Patricia Verlangieri (57) ABSTRACT

The track jumping of a scanner on optical storage media in which information items are stored on groove and land tracks or which have not yet been written to is intended to be made possible in a reliable manner. For this purpose, firstly a fictitious track type is defined for a regulating circuit, which regulates the position of the scanner. The regulating circuit is then closed on the basis of the track type defined and a track scanning signal. The reaction of the scanner to the closing is detected in order to obtain from this an item of information about the track type. This method is also advantageous, in principle, for closing the track following regulation in information carriers having relatively high storage densities.

13 Claims, 9 Drawing Sheets

METHOD AND APPARATUS FOR TRACK TYPE IDENTIFICATION, AND METHOD OF TRACK JUMP

This application claims the benefit, under 35 U.S.C. § 365 of International Application PCT/EP01/14460, filed Dec. 10, 2001, which was published in accordance with PCT Article 21(2) on Jun. 27, 2002 in English and which claims the benefit of German patent application No. 10064053.2, filed Dec. 21, 2000.

The present invention relates to an apparatus and a method for track identification and for track following regulation. In particular, the present invention relates to the track jumping on data carriers, in particular optical data carriers, having a plurality of track types. Moreover, this invention makes it possible to close the track following regulating circuit at significantly higher track crossing speeds of the optical scanner, which results from smaller track widths (higher storage density), faster rotation speeds (higher data rate) and greater eccentricity of future storage media.

In the case of a track jump according to conventional methods, the track regulating circuit is opened prior to a jump and the actuator which moves the objective lens and thus the scanning beam is then accelerated in the direction of the destination track, and decelerated shortly before reaching the destination track by means of predetermined pulse lengths. In the case of the storage media (CD, CD-ROM, CD-VIDEO, CD-R, CD-RW, DVD-ROM, DVD-R and DVD-RW) that are commercially available at the present time, it is ensured that, at the instant at which the track following regulating circuit is closed, the polarity is already previously known in accordance with the track in which the track regulator is to lock the scanning beam. In these storage media, signals TZC and MZC are used in order to detect the position of the scanning beam relative to the track. In this case, e.g. the signals TZC (track zero cross) and MZC (mirror zero cross) can be obtained from the track error and mirror signals which originate from the optical scanner.

Figure 6:
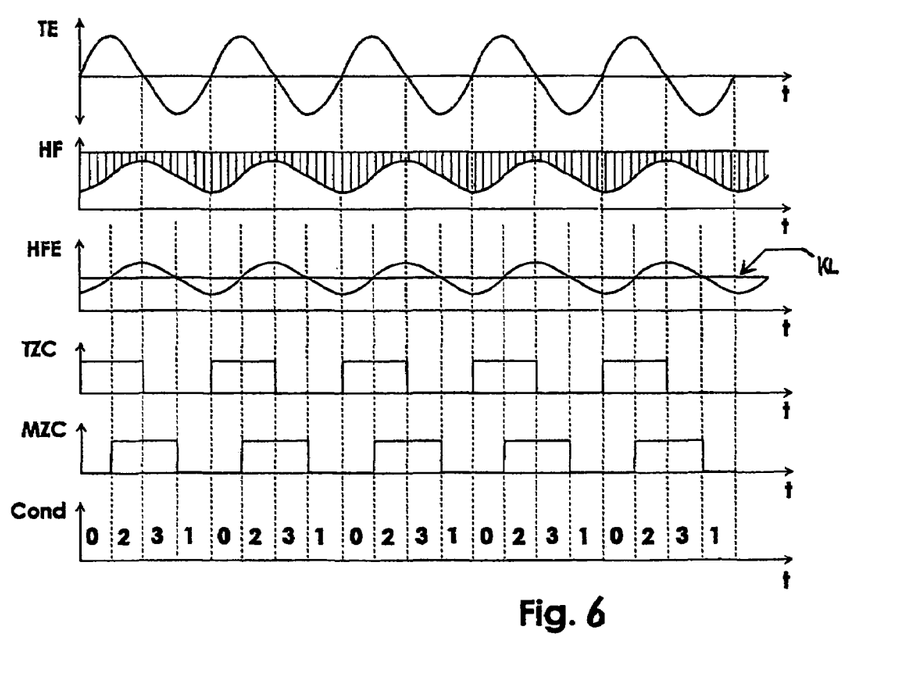
FIG. 6 shows a signal flow diagram of signals for determining the track type according to the prior art.

The signal TZC is generated, in accordance with FIG. 6, by comparison of the track error signal TE with zero with the aid of a comparator. The track error signal TE itself can be formed with the aid of various track error forming methods, such as, for example, push-pull, DPP, DPD, 3-beam. The signal TZC exhibits a change or an edge whenever the centre of an information track of the data carrier, also called groove, or the centre of the region between two information tracks, which is also called land, is reached.

Since, in storage media of the type specified above that have already been written to, useful data are stored only on tracks formed as a depression, so-called grooves, it is possible to additionally evaluate the signal MZC in order to distinguish the written information track, groove, from the unwritten region in between, land.

The signal MZV is formed in a similar way. For this purpose, use is made of the property whereby the HF modulation is greatest on track centres and the lower envelope of the HF signal exhibits a low reflection factor, whereas in the centre between the tracks, the HF modulation is small and the lower envelope exhibits a higher reflection factor. In order to detect this, the lower envelope (HFE) is formed from the DC-coupled HF signal by peak value detection. The output signal of this peak value detector is applied to a comparator either directly or after passing through a low-pass filter, which comparator compares its input signal with a threshold value KL and generates the binary signal MZC.

As an alternative, the MZC signal can be formed with the aid of a low-pass filter and a comparator (not illustrated). For this purpose, the summation signal of selected detectors is subjected to low-pass filtering in order to filter the high-frequency signal components of the stored information items, the so-called pits, and obtain a signal proportional to the average reflectivity. This signal is often called a mirror signal, UMIA. In the case of the disc format mentioned above, the average reflectivity differs between the written tracks (typ. groove, series of pits) and the regions in between (typ. land), as already explained above. A comparator then compares the mirror signal with a threshold value and thus generates the signal MZC.

Figure 2:
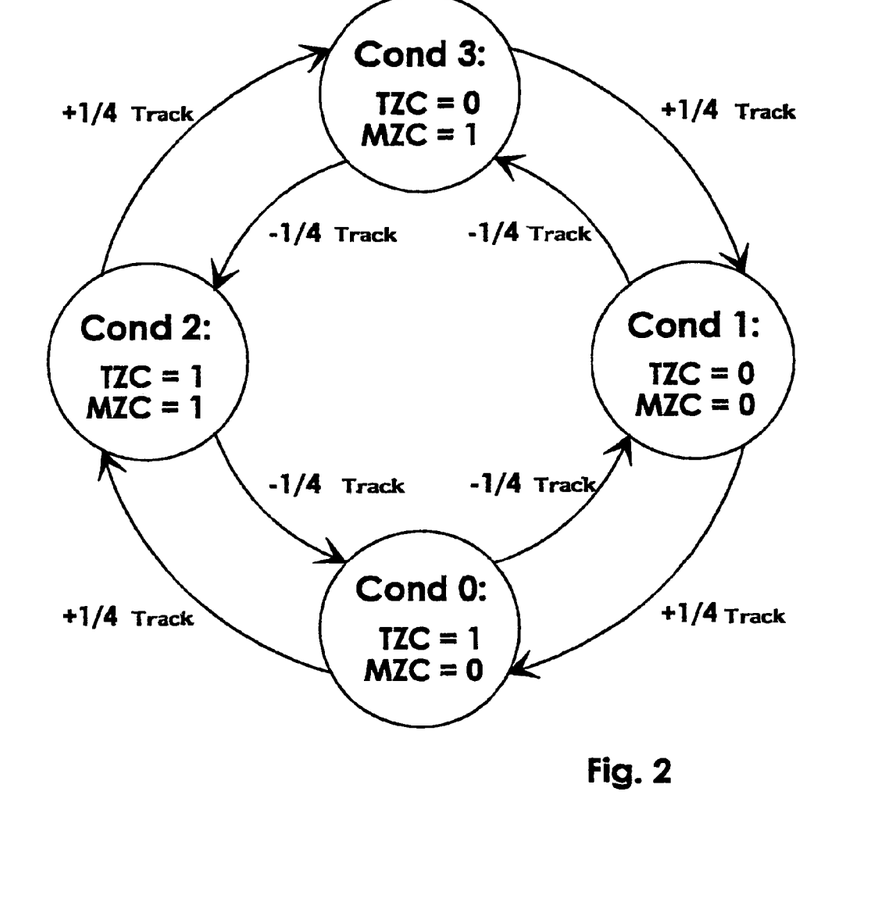
FIG. 2 shows a diagram for determining the track type and direction of movement of the scanner according to the prior art.

Depending on the direction of movement of the scanning beam, relative to the tracks situated on the optical storage medium, there is a phase shift of +90 degrees or −90 degrees between the signals TZC and MZC, which corresponds to a quarter of a track width. From FIGS. 6 and 2, it is then possible, after evaluation of the signals MZC and TZC, to perform an unambiguous assignment of the track type which is currently being swept over by the scanning beam. This is illustrated by the state Cond, which can assume the values 0 to 3. Furthermore, the circle diagram of FIG. 2 reveals the direction in which the scanning beam or the spot moves with regard to the surface of the optical storage medium. Proceeding from Cond 3 (TZC=0, MZC=1), there follows either Cond 1 (TZC=0, MZC=0) or Cond 2 (MZC=1). Depending on whether the subsequent state Cond 1 or Cond 2 is present, it is possible to make a clear statement about the direction of movement of the actuator with regard to the track situated on the optical storage medium.

Figures 3, 4:
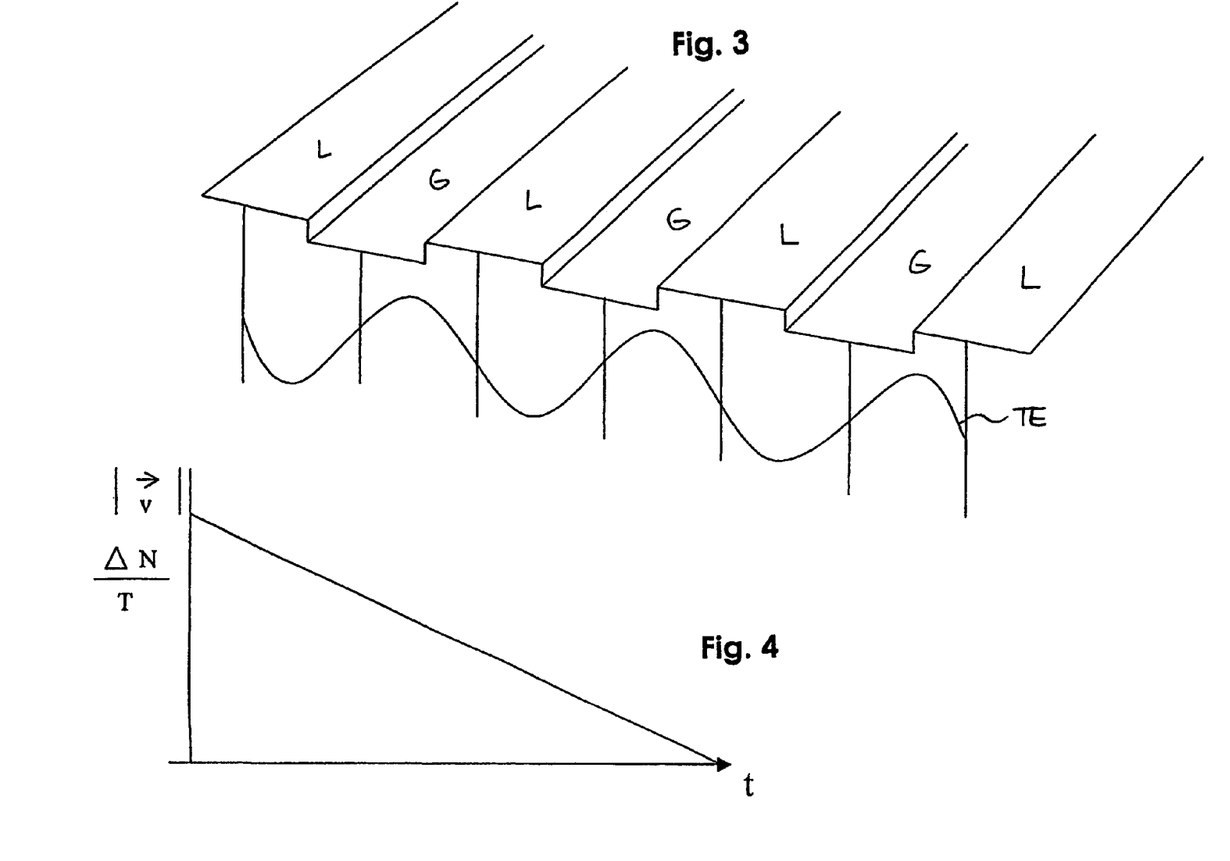
FIG. 3 shows the track error signal with regard to groove/land changes.
FIG. 4 shows a diagram relating to the decrease in track speed as a function of time.

FIG. 3 shows the signal TE with regard to a scanning location of a scanning beam relative to the groove/land structure (G/L) of an optical data carrier. FIG. 4 shows, by way of example, on the basis of the decreasing relative speed ΔN/T, the optimum deceleration operation of an actuator after a track jump, disregarding the relative speed of the actuator with regard to the eccentricity of a disc. As is evident, the number N of tracks swept over per defined unit of time becomes smaller and smaller until it reaches zero. At this instant, the track jump is ended, the track following regulating circuit is activated and the actuator speed with regard to the track is zero.

In the case of new storage media and optical disc systems, a valid signal MZC can no longer be generated in all cases. In this respect, two fundamental cases can be distinguished:

Case 1: the optical storage medium has been written to both on groove and on land.

Case 2: the optical storage medium is unwritten.

Figure 1:
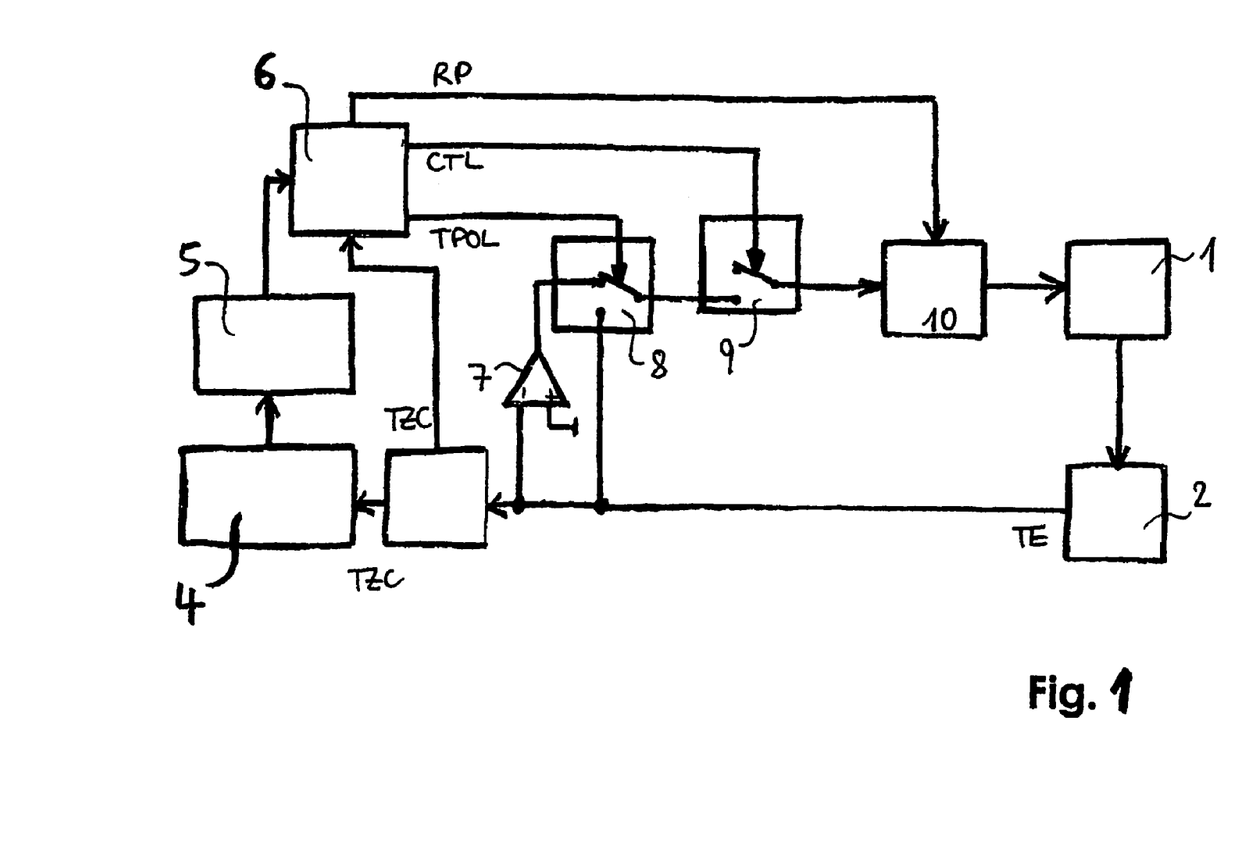
FIG. 1 shows a circuit diagram of the invention's apparatus for a track jump.
Figure 5:
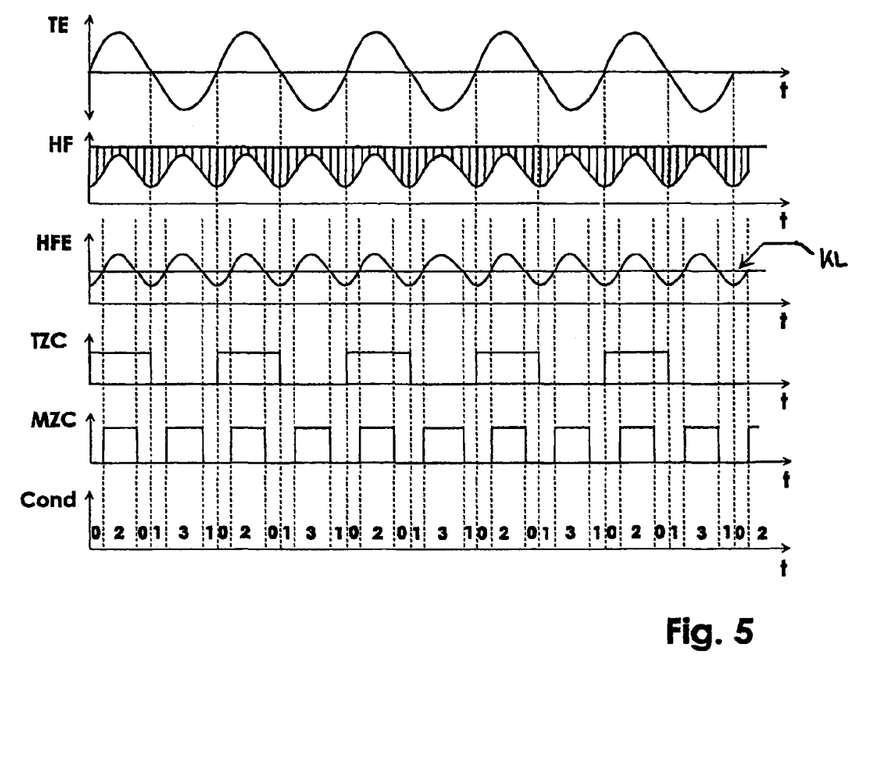
FIG. 5 shows a signal flow diagram of signals in the case of storage media with written groove and land tracks.

If, in accordance with Case 1, both track types have been written to, then the result, as shown in FIG. 5, is a maximum of the HF amplitude both in the track centre of the track type groove and in the centre of the track type land. The HF amplitude decreases in the centre between these two written regions. Therefore, in contrast to the signal waveform of the envelope of the HF signal as shown in FIG. 1, in the case of a disc written to on groove and land, the frequency of the envelope is twice as high, while the frequency and position of the track error signal and of the resultant signal TZC remain as in the prior art. Accordingly, phase and direction of movement of the scanning beam can no longer be determined unambiguously from the two signals MZC and TZC in the case of a disc written to on groove and land.

In accordance with Case 2, an MZC signal cannot be obtained if data markings are not present on the disc. This is the case with all completely or partly blank optical storage media of the types CD-R, CD-RW, DVD+RW, DVD-RW, DVD-RAM and also with future types such as DVR. Owing to the consequently absent HF signal, no MZC signal can be obtained from the envelope. The second described method for obtaining the MZC signal is also possibly unsuitable since a contrast between the unwritten groove or land tracks is not prescribed or detectable.

A track jump is usually effected by acceleration and deceleration of the actuator with the aid of temporarily predetermined pulses, by coarse movement of the scanner by means of a drive (motor) and by counting down crossed tracks. This applies to optical storage media which have no address information items in the form of pre-pits, and in which the information items are stored only in depressions (grooves). However, in optical storage media whose information items are stored both in depressions (grooves) and elevations (land), the correct polarity of the track error signal (track error) must be known as an additional regulating parameter, depending on the type of destination track, before the track regulator is switched on. Since a valid MZC signal cannot be generated for this type of optical storage medium, the type of track on which the track regulator is to be activated cannot be determined. The consequence of this is that the track following regulating circuit cannot always be closed successfully, since only the TZC signal is available as a criterion. In contemporary systems, the actuator, if it is closed with incorrect polarity information of the regulator is accelerated from the destination track.

An object of the present invention consists in reliably identifying a track type, and thereby ensuring reliable track jumps, even in optical storage media in which different track types are present, for example those in which information items are recorded both in the depressions (grooves) and elevations (land), and in optical storage media which are unwritten.

According to the invention, this object is achieved by means of a method according to claim 1 and an apparatus according to claim 10. Preferred further developments can be found in the subordinate claims. Consequently, in an advantageous manner, from the reaction of the actuator upon closing the track following regulating circuit on an arbitrary track, the type thereof or the required track polarity is identified. As soon as the actual track type is identified, the regulator parameters or parameters of the track following regulating circuit can be set correspondingly and deceleration of the optical scanner can be carried out effectively after a jump.

The present invention will now be explained in more detail with reference to the accompanying drawings, in which.

Exemplary embodiments on the present invention are explained in more detail below. Firstly, the circuit diagram of FIG. 1 will be used to set forth the invention's functional principle of a track jump on optical data carriers having groove and land tracks.

If a track jump over a relatively long jump distance is initiated then the track regulating circuit 1, 2, 7, 8, 9, 10 is opened and the scanner 1 is displaced by the jump distance by means of a motor. This is also referred to as a coarse jump with a track motor. This is done by counting down the tracks to be crossed. Having arrived at the (provisional) jump destination, the coarse jump is ended and an attempt is made to close the track regulating circuit 1, 2, 7, 8, 9, 10 at the destination position. Since the destination position may lie on a groove track or on a land track and no MZC signal is available, the procedure follows an unspecified track search principle described below with regard to FIG. 1.

An optical scanner 1 supplies scanning signals and, in particular, the signals which are required for generating a track error signal TE in an evaluation unit 2. The TZC signal is generated from the TE signal by means of a zero voltage crossing detector 3. The TZC signal is then fed both to the TZC frequency measurement 4 and to the actuator deceleration control 6. The TZC frequency measurement 4 has the task either of measuring the number of tracks swept over by the scanning beam per defined unit of time (frequency measurement) or of storing the time between two zero crossings (period duration measurement).

A change detection 5 has the task of ascertaining, from the values determined by the TZC frequency measurement (or period duration measurement) 4, whether the number of tracks swept over by the optical scanner per defined unit of time increases or decreases, or whether the time between two zero crossings of the TZC signal becomes longer or shorter. This information obtained is forwarded to the actuator braking control 6. In this way, it is possible to detect a reaction of the actuator for example to the closing of the regulating circuit.

The actuator deceleration control 6 have the task of prescribing the track polarity TPOL to a changeover switch 8 according to defined strategies and/or of opening or closing the track following regulator 10 according to the selected method via the control line CTL by means of a switch 9 and/or of setting regulating parameters RP of the regulator 10. The polarity of the signal TE is inverted by the block 7. Depending on the track polarity TPOL, the signal TE or the inverted signal TE is fed to the track regulator 10 via the changeover switch 8. The setting of the regulating parameters directly influences the regulator behaviour and thus directly influences the actuator and coupling-in behaviour. The control CTL effects activation or deactivation of the track regulator 10, which regulates the actuator of the optical scanner 1 by means of an actuator regulating signal.

An increase in the TZC frequency results, for example, when, owing to a loop polarity preselected by TPOL and/or an incorrectly selected activation instant of the regulator, the closed regulator 10 constitutes a positive feedback loop and forces the actuator away from a track. Therefore, the selected track polarity TPOL and the activation time period—controlled by CTL—of the regulator 10 should be considered jointly in each case.

The same principle is also employed in the event of normal coupling-in of the regulation into an unknown track.

In accordance with the present invention, the problem of the absent MZC information in the case of track jump can now be solved by means of the following procedures:

In accordance with a first method, the regulator 10 or the entire regulating circuit is continuously closed, starting from a specific instant, during either the positive or negative half-cycles of the track error signal TE by the control signal CTL, a specific track polarity TPOL of the error signal being preselected. The activation time of the regulator 10 by the control signal CTL can be derived for example from the signal TZC.

Figure 7:
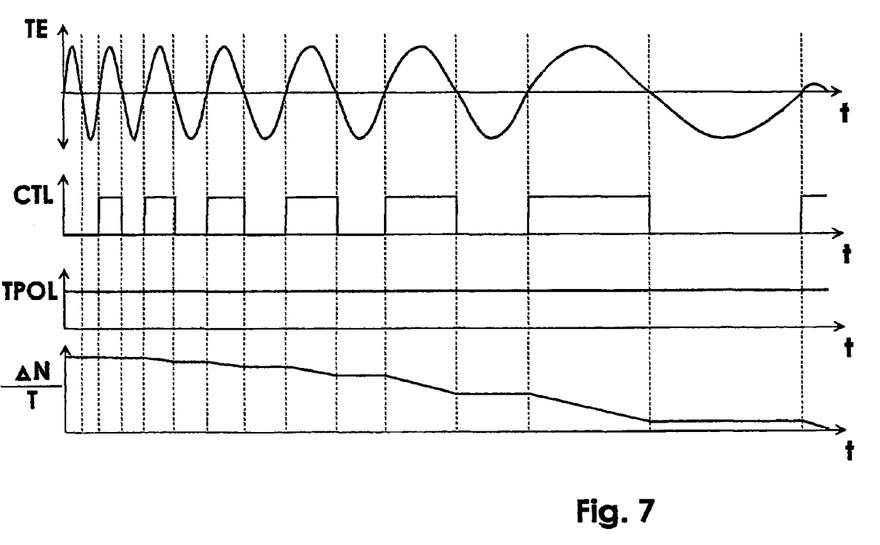
FIG. 7 shows a signal flow diagram in the case of interrupted activation of the track following regulating circuit in the case of a track polarity originally set correctly.

Signal profiles with regard to such a method are illustrated by way of example in FIG. 7.

The signal CTL is derived directly from the signal TZC (not represented in FIG. 7, but see FIG. 1) and activates the regulator during the positive half-cycle of TE. Once the half-cycle of TE which corresponds to the signal TZC is ended, the regulator is opened by means of CTL and the TZC frequency is determined. The value determined is forwarded to the change detection 5, where it is stored for further processing. In the figure, a change in the frequency of the signal TZC is specified as a number ΔN of tracks crossed in a time T, that is to say as ΔN/T. If the TZC frequency decreases relative to the value measured last, or the time duration between two TZC zero crossings has lengthened relative to the value measured last, the correct polarity of TPOL was assumed and the correct regulating parameters RP were set. In accordance with these correctly assumed specifications, the actuator deceleration control 6 can continue until the track jump has been successfully concluded and the regulator can be permanently closed.

If an increase in the TZC frequency or a shortening of the time period between two successive zero crossings of the TE signal is determined by the change detector 5, it is concluded from this that the track polarity TPOL must be inverted. Once the inversion has been effected, the procedure continues with the same strategy as above, since now it is reliably ensured that the polarity now selected is the correct one. This case of a momentary increase in the TZC frequency in conjunction with an initially incorrect selection of the track polarity TPOL is represented in FIG. 8.

If the difference between two measurements of the TZC frequency is too small, no change is made until the next measurement instant. Only when significant differences can be ascertained in the number ΔN of tracks swept over by the scanning beam during a predetermined unit of time can it be deemed certain that the preselected track polarity is the correct one or that the track polarity must be adapted to the true conditions. As an alternative, the inversion can also be effected when a predetermined absolute frequency or speed ΔN/T is exceeded.

Figure 8:
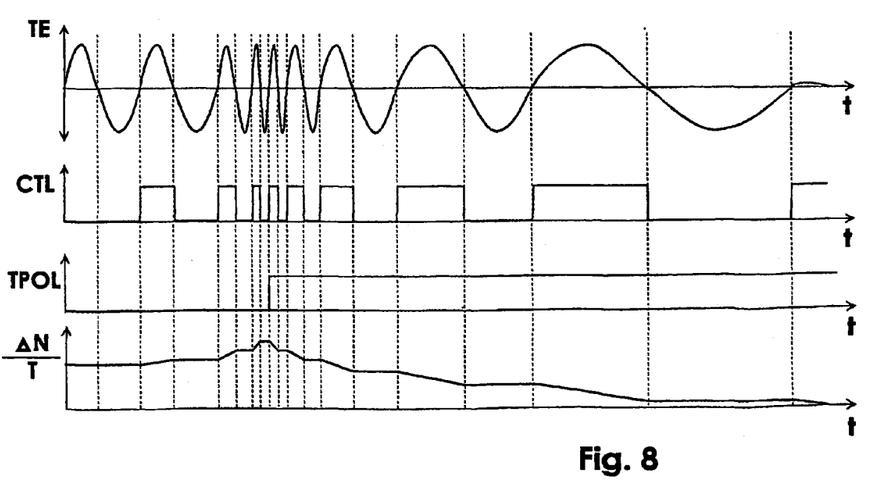
FIG. 8 shows a signal flow diagram in accordance with FIG. 7, the track polarity initially being set incorrectly.

The signal diagrams illustrated in FIGS. 7 and 8 correspond to one exemplary embodiment relating to the first method. A further exemplary embodiment in accordance with the first method could be realized by the regulator 10 being activated during the negative half-cycles (CTL=inv. TZC) and the polarity TPOL likewise being used inverted with respect to the signal profiles illustrated in FIGS. 7 and 8. This variation can also be applied analogously to the examples below.

Figure 9:
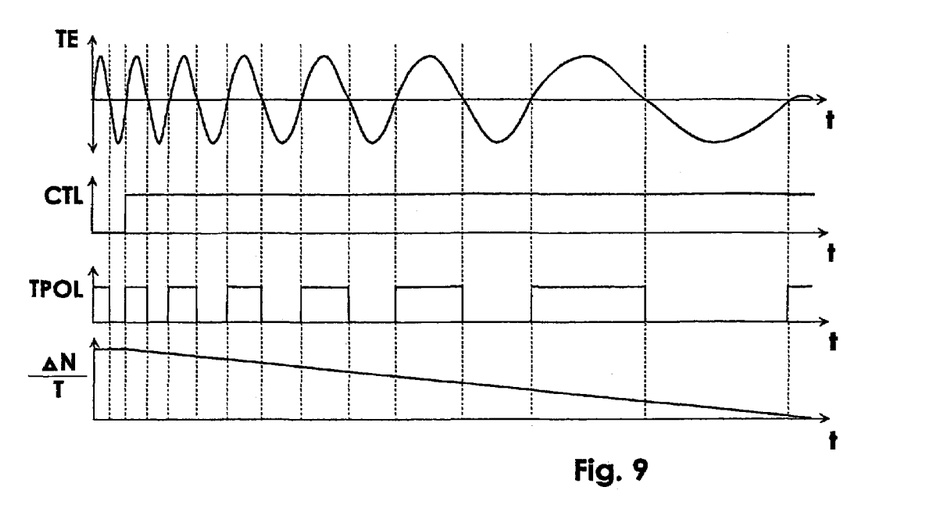
FIG. 9 shows a signal flow diagram of a regulating circuit in which the regulating circuit remains closed and the track polarity is changed as regulating parameter.

In accordance with a second method, in order to achieve an amplification of the deceleration operation, in contrast to the first method, the regulator 10 is always kept closed starting from a predetermined instant. The consequence of this is that the track polarity TPOL has to be adapted depending on the phase angle (positive or negative half-cycle). To that end, the track polarity TPOL is derived from the signal TZC, for example. A change in the polarity then means, for example, that the signal TPOL corresponds either to the direct or to the inverted signal profile of TZC. If, at the instant when the regulator 10 was closed, the correct polarity was selected or set as the initial value, the TZC frequency, which can be determined at freely selectable instants, rapidly decreases and successful locking into the destination track becomes possible significantly more rapidly. This can be seen from FIG. 9. It should be noted that in this case, as mentioned, the track polarity is adapted for each half-cycle.

Figure 10:
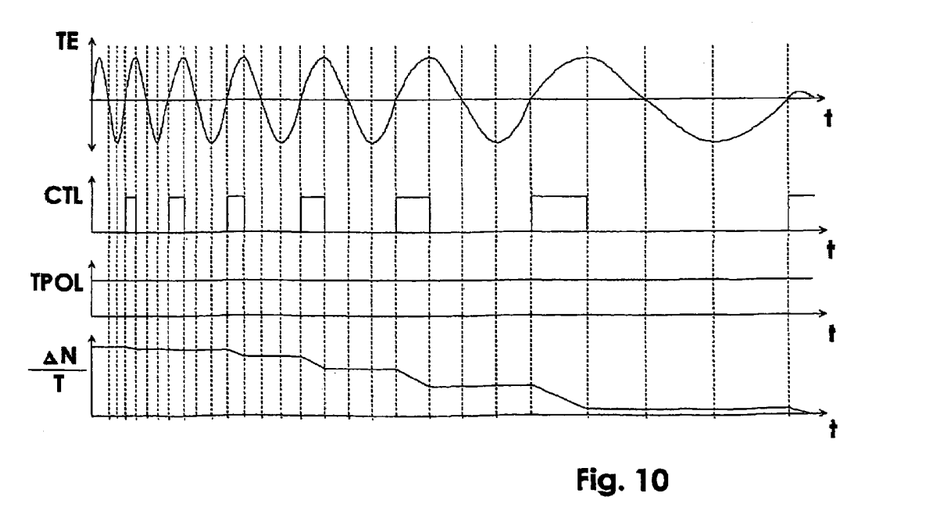
FIG. 10 shows a signal flow diagram of a regulating circuit in which the track following regulating circuit is closed only during a quarter-cycle of the track error signal.

In the case of driving-sensitive actuators, in which a very fast deceleration is effected with negative feedback of the regulating circuit (TPOL was chosen correctly) or a very fast acceleration is effected with positive feedback of the regulating circuit (TPOL was chosen incorrectly), it is often useful to proceed according to the third method illustrated in FIG. 10. The difference with respect to the first two methods resides in the fact that in this case the regulator 10 is closed only beginning at a positive half-cycle of TE for an arbitrarily selectable period of time (but always shorter than the time for a complete half-cycle). As is described above, the track polarity TPOL is chosen freely and only changed if the change detection reports a rise in the TZC frequency beyond the predefined scope. The shorter switch-on of the regulator 10 also allows earlier identification of the regulating reaction, with the result that, in the case of an incorrect choice of track polarity TPOL, the acceleration of the actuator is identified earlier and the track polarity TPOL is corrected earlier. FIG. 10 describes the case in which the polarity is chosen correctly. Furthermore, it is possible, by changing the regulator switch-on time, to control the deceleration of the actuator, as already indicated in FIG. 4. To that end, the control signal CTL is chosen to be variable, that is to say, unlike in the examples illustrated, over a quarter-half or half-cycle of the signal TE.

Figure 11:
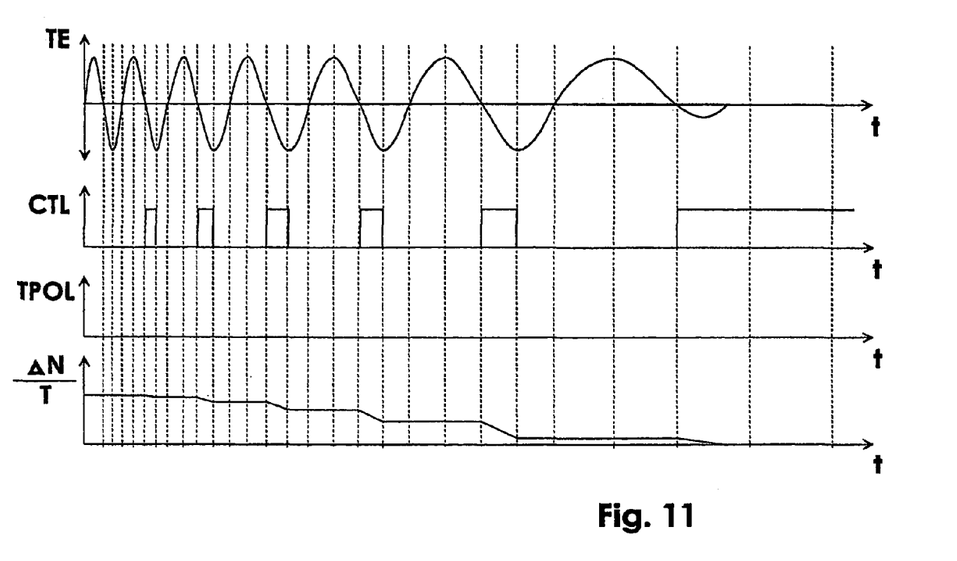
FIG. 11 shows a signal flow diagram in accordance with FIG. 10, the track following regulating circuit being closed only during half the negative half-cycle of the track error signal.

A fourth method, which basically corresponds to the third method, is illustrated in FIG. 11. In this fourth method, however, the regulating circuit is always closed during the negative half-cycles of TE. The regulating circuit is preferably closed at the beginning of the negative half-cycle. In this respect, cf. FIG. 10, which describes the case in which the polarity was also chosen correctly.

Figure 12:
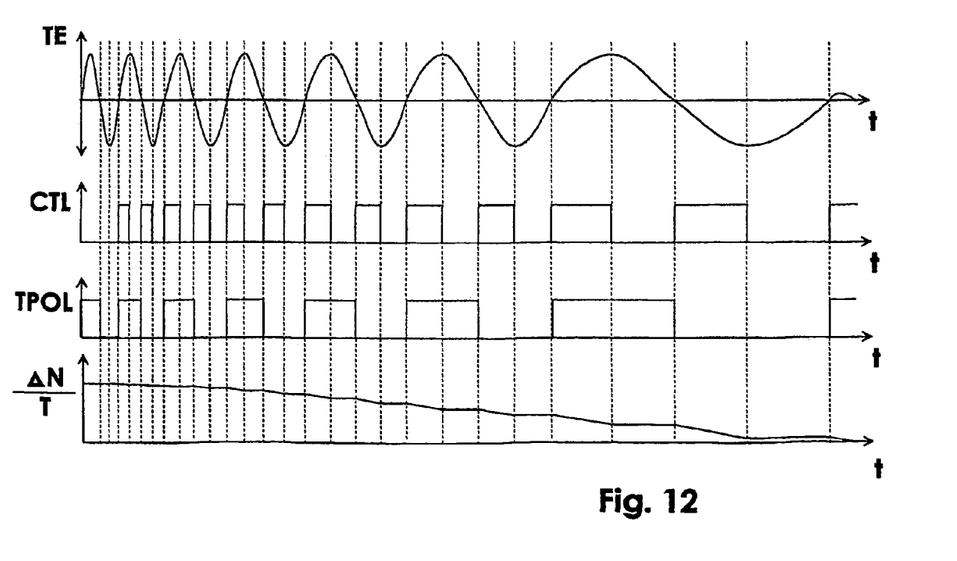
FIG. 12 shows a signal flow diagram in accordance with a combination of the methods of FIGS. 10 and 11.
Figure 13:
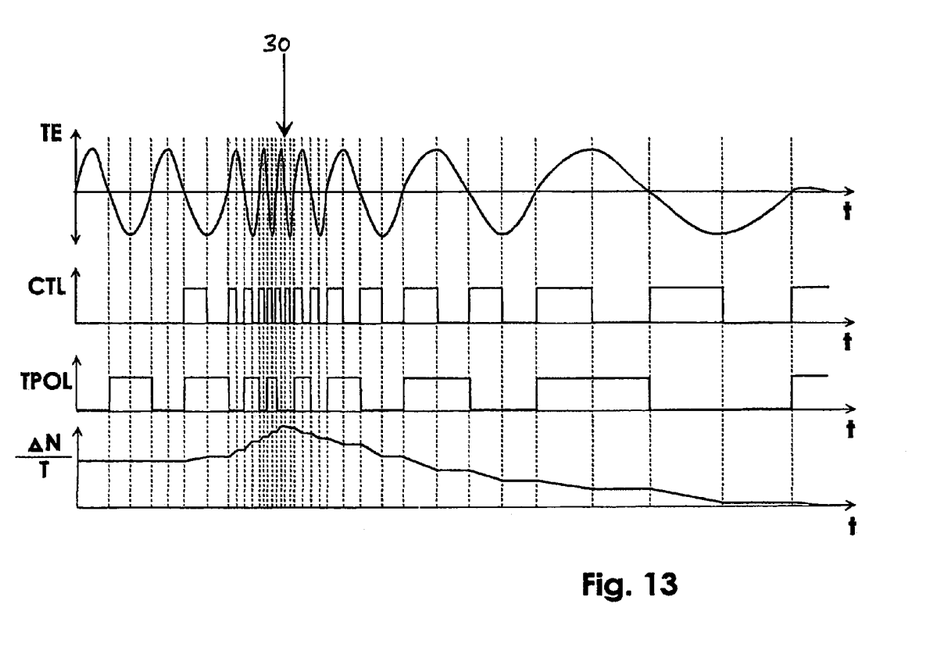
FIG. 13 shows a signal flow diagram in accordance with FIG. 12, the track polarity initially being set incorrectly.

A fifth method by which the regulator 10 can be successfully closed without a valid MZC signal is shown in FIGS. 12 and 13. FIG. 12 shows the case in which the correct polarity was preselected, and FIG. 13 shows the case in which the procedure first began with the incorrect polarity but then, after identification of the increase in the TZC frequency, continued with the correct polarity starting from the instant identified by the arrow 30. In this exemplary embodiment, TPOL is continually adapted to the TE signal.

This means that the positive values of TE are always assigned, for example, a logic 1 of the TPOL signal and the negative values of TE are assigned the logic value 0. Consequently, the signal TPOL is a mapping of the signal TZC. If the start assignment of the TPOL signal was chosen incorrectly and positive feedback of the regulation is established for this reason, TPOL must be inverted with regard to the phase angle of TZC or the half-cycle of TE. As in the third and fourth methods, the regulating algorithm is always activated at the beginning of a half-cycle and preferably only for a predetermined time interval of the half-cycle. Since, in this case, this is effected both during negative and during positive half-cycles, this accelerates the coupling-in process into the destination track.

It proves to be advantageous that, during the coupling-in or track jump operation, the track regulator is closed only in proximity to the track centre, that is to say when the track error signal TE is almost zero. In all the variants described above, this criterion is taken into account since the regulator is always closed directly after a zero crossing of the TZC signal. At this instant, the TE signal is almost zero, and hence regulating complexity for coupling-in is the lowest, disregarding the speed given by the inherent speed of the actuator and superposed as a result of a track jump or on the relative speed of the scanner with regard to the eccentricity of the data carrier. In all of the cases mentioned, variation of the regulating parameters RP, that is to say adaptation of the regulator behaviour to the behaviour ascertained by the change detection, can also shorten or lengthen the coupling-in process.

Consequently, the method according to the invention reliably enables track jumping in optical storage media in which the MZC signal either can only be generated in an unreliable manner or cannot be generated at all. Moreover, locking into a track is significantly more reliable both in the case of data carriers having a relatively high storage density and, as a result, narrower tracks and in the case of discs having a relatively high degree of eccentricity. This is also of crucial importance at the faster rotational speeds and hence higher data rates of future optical storage media.

The invention claimed is:

1. Method for track identification on data carriers, having the steps of
    defining a first track type,
    closing a track following regulating loop for regulating an actuator on the basis of the first track type and a track scanning signal by means of an actuator regulating signal,
    detecting the reaction of the actuator and/or the actuator regulating signal for the purpose of track identification.

2. Method according to claim 1, wherein the reaction of the actuator is an acceleration or deceleration and/or the track scanning signal comprises an item of information about an actuator acceleration or deceleration.

3. Method according to claim 2, wherein acceleration of the actuator occurs if the track scanning signal does not correspond to the first but to a second track type, and a deceleration of the actuator occurs if the track scanning signal corresponds to the first track type.

4. Method according to claim 1, wherein the first track type is a land track or a groove track and the second track type is the respective other track.

5. Method for track following regulation with the track identification according to claim 1 and the further step of co-ordinating the polarity of the first track type in accordance with the actuator reaction and/or the actuator regulating signal.

6. Method according to claim 1, wherein an actuator behavior is changed by varying regulation parameters during and/or after a track jump.

7. Method for track jumping of a scanner on a data carrier, having the steps of
    opening a track following regulating circuit,
    moving the scanner toward a destination track,
    while moving the scanner identifying a track type using the method of claim 1 and/or momentarily activating track following regulation, and
    decelerating the scanner for the purpose of track coupling-in on the basis of the identified track type and/or a reaction of an actuator and/or an actuator regulating signal.

8. Method according to claim 7, wherein the scanner is decelerated in a manner dependent on the track scanning signal, in particular a track error signal by multiple activation and deactivation of the track following regulation and/or by changing the track polarity selected in accordance with the first track type, and/or by co-ordinating the regulating parameters of the track following regulation.

9. Method according to claim 8, wherein the track following regulation is activated and deactivated in a manner dependent on the track error signal and/or with a predetermined time duration.

10. Apparatus for track identification on data carriers, having
    an actuator device for moving a scanning device which can be used to scan tracks of a data carrier,
    a regulating device for regulating the actuator by means of an actuator regulating signal on the basis of a predetermined track type and a track scanning signal from the scanning device,
    a detection device for detecting the reaction of the actuator and/or the actuator regulating signal and for outputting one or more detection signals, and
    a signal processing device for track identification on the basis of the detection signal/signals.

11. Apparatus according to claim 10, wherein the detection device has a change detection device, which can be used to ascertain, on the basis of the track scanning signal, the speed or changing speed with which the optical scanner sweeps over tracks.

12. Apparatus for track following regulation and/or for a tracking jump having
    an apparatus for track identification using the apparatus of claim 10 and
    a switching device for selling the track polarity and/or activating/deactivating the regulating device and for prescribing regulating parameters on the basis of one or more signals of the signal processing device.

13. Apparatus for reading from and/or writing to optical recording media having an apparatus for track identification according to claim 10 and/or and apparatus for track following regulation.

* * * * *